United States Patent
Deshpande et al.

(10) Patent No.: US 8,155,711 B2
(45) Date of Patent: Apr. 10, 2012

(54) SERVICE SEARCH BASED ON BATTERY CHARGER

(75) Inventors: Yogen Nandkumar Deshpande, San Diego, CA (US); Bhupesh Manoharlal Umatt, Poway, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 348 days.

(21) Appl. No.: 12/479,234

(22) Filed: Jun. 5, 2009

(65) Prior Publication Data

US 2010/0311473 A1    Dec. 9, 2010

(51) Int. Cl.
*H04M 1/00*        (2006.01)
(52) U.S. Cl. ............... 455/573; 455/434; 455/452.2; 455/574
(58) Field of Classification Search .............. 455/573, 455/574, 522, 456, 343.5, 414.1, 436, 439, 455/9, 13.4, 67.11, 572, 154.2, 343.6, 452.2; 320/108
See application file for complete search history.

(56) References Cited

U.S. PATENT DOCUMENTS

| | | | |
|---|---|---|---|
| 5,794,146 A | | 8/1998 | Sevcik et al. |
| 7,948,208 B2 * | | 5/2011 | Partovi et al. ............... 320/108 |
| 7,961,092 B2 * | | 6/2011 | Freathy et al. ........... 340/539.13 |
| 2003/0104849 A1 * | | 6/2003 | Arimitsu ..................... 455/574 |
| 2005/0048960 A1 | | 3/2005 | Yamauchi et al. |
| 2007/0129045 A1 * | | 6/2007 | Aerrabotu ................. 455/343.5 |
| 2009/0259936 A1 * | | 10/2009 | Tanskanen et al. ........... 715/700 |

FOREIGN PATENT DOCUMENTS

EP    0553771    8/1993

OTHER PUBLICATIONS

International Search Report and Written Opinion—PCT/US2010/037597, International Search Authority—European Patent Office—Aug. 13, 2010.

* cited by examiner

*Primary Examiner* — Tan Trinh
(74) *Attorney, Agent, or Firm* — Darren M. Simon

(57) ABSTRACT

Aspects describe modifying a service search pattern based on whether a device battery is being charged or is not being charged (e.g., is connected to a battery charger or not connected to a battery charger). A power conservative search pattern can be utilized if the battery is not being charges. If the battery is being charged, the search pattern can be an aggressive search pattern. Further, the search pattern can change if there is a change in whether the battery is being charged. The rate of charging the battery, a current battery level, amount of power consumed during the search, and/or the power being input by the battery chargers can be utilized to select and/or modify a network search pattern. Further, a user can select or change a search pattern through interaction with a user interface.

50 Claims, 12 Drawing Sheets

SERVICE SEARCH BASED ON BATTERY CHARGER

BACKGROUND

I. Field

The following description relates generally to wireless communications and more particularly to searching for service as a function of battery charging status.

II. Background

Wireless communication systems or networks are widely deployed to provide various types of communication; for instance, voice and/or data may be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless network market deployments generally include multiple carriers (or networks) and roaming agreements between carriers, referred to as roaming partners. Each carrier usually desires that the mobile device, which has subscribed to that carrier's service (referred to as a home network) perform functions or calls (e.g., data transfer, communication, and so forth) on the home network as long as possible. Only when the mobile device is moving out of the coverage of the home network, or for some other reason cannot obtain home network coverage, should the mobile device transfer to a roaming partner's coverage. Further, while in a roaming coverage, the mobile device should attempt to search for home network coverage or a "higher priority" coverage.

When a mobile device goes out of service, the device attempts to search for service and regain the wireless service. Service search operations consume power and, thus, drain the device battery. Service search operation is such that the service search is conducted in the same manner regardless of the battery status (e.g., high battery charge level, low battery charge level, and so forth) and whether or not the battery is being charged from an external source.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with modifying a service search pattern as a function of battery charging status (e.g., is the device being charged from an external source or not). According to some aspects, the service search pattern is adjusted as a function of an existing battery charge level (e.g., 90% battery charge, 55% battery charge, 12% battery charge, and so forth). According to some aspects, the service search pattern is selected by the user though a user interface.

An aspect relates to a method performed by a mobile device for searching for service in a wireless communications network. Method employs a processor to implement various acts, such as determining a battery charging status when a network connection is lost and selecting a network search pattern as a function of the battery charging status. Further, method includes searching for service with the selected network search pattern and establishing a connection with the network or a different network.

Another aspect relates to a wireless communications apparatus that comprises a memory and a processor. The memory retains instructions related to evaluating a battery charging status when apparatus is powered on or when network access is lost and choosing a service search pattern as a function of the evaluation. Memory also retains instructions related to continuing to monitor the battery charging status, modifying the search pattern if the battery charging status changes, and discontinuing the search when network access is established. Processor is coupled to the memory and is configured to execute the instructions retained in the memory.

A further aspect relates to a communications apparatus that selects a service search pattern. Communications apparatus includes means for employing a service search pattern based on a battery charging status. The battery charging status is one of being charged and not being charged. Communications apparatus also includes means for monitoring status of the battery charge level and the battery charging status and means for altering the service search pattern if the monitoring indicates a change to the battery charge level status or the battery charging status. The service search is terminated when a service connection is established.

Still another aspect relates to a computer program product comprising a computer-readable medium. The computer-readable medium comprises a first set of codes for causing a computer to evaluate a battery charging status or when a network connection is lost or sought and a second set of codes for causing the computer to choose a network search pattern as a function of the battery charging status. Computer-readable medium also includes a third set of codes for causing the computer to search for service with the selected network search pattern and a fourth set of codes for causing the computer to establish a connection with the network or a different network.

Yet another aspect relates to at least one processor configured to search for a network as a function of a battery charging status. Processor includes a first module for evaluating a battery charging status when network access is lost or sought and a second module for choosing a service search pattern as a function of the evaluation. Processor also includes a third module for continuing to monitor the battery charging status, a fourth module for modifying the search pattern if the battery charging status changes, and a fifth module for discontinuing the search when network access is established.

A further aspect relates to at least one processor configured to search for service as a function of a user input. The processor includes a module for accepting an input related to a service search pattern. The input can be received from a user through a user interface. Further, the input can be received before or after going out of service. Processor can also include a module that prompts for a service search pattern choice. The prompt can be presented to a user through a user interface.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description

DETAILED DESCRIPTION

Figure 1:
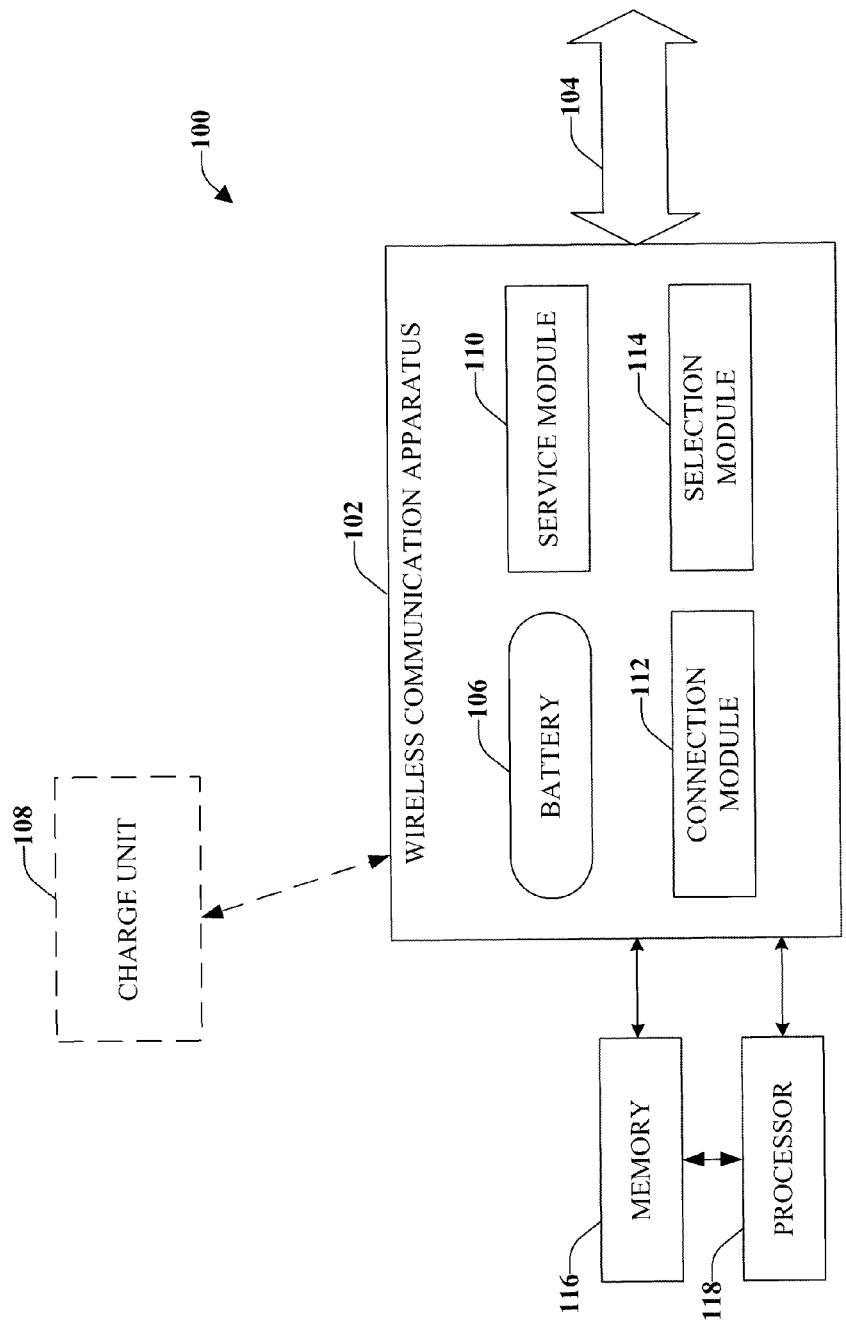
FIG. 1 illustrates a system that searches for service in a wireless communications network as a function of a battery charging status, in accordance with an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, Cell, Downlink Transmitter, or some other network entity.

Various aspects or features will be presented in terms of systems that may include a number of devices, components, modules, and the like. It is to be understood and appreciated that the various systems may include additional devices, components, modules, and so forth, and/or may not include all of the devices, components, modules, and so on, discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

FIG. 1 illustrates a system 100 that searches for service in a wireless communications network as a function of a battery charge status, in accordance with an aspect. System 100 includes a wireless communication apparatus 102 that is shown to be transmitting data through a channel 104. Although depicted as transmitting data, wireless communication apparatus 102 can also receive data through the channel 104 (e.g., wireless communication apparatus 102 can transmit and receive data at substantially the same time, wireless communication apparatus 102 can transmit and receive data at different times, or combinations thereof).

When wireless communication apparatus 102 loses service (e.g., loses its connection to a network) and/or when apparatus 102 is powered "on", apparatus 102 attempts to search for service (e.g., search for connectivity with a network in order to register with the network to be able to perform data exchanges with other devices). This service search operation consumes power and, therefore, drains the battery 106. However, when apparatus 102 is being charged through a battery charger or charge unit 108 or external source, then power consumption becomes less of a concern and apparatus 102 can engage in a more aggressive service search compared to when apparatus 102 is not being charged.

An aggressive service search refers to a way of searching that employs more time in searching relative to the time of "sleep" (e.g., turning certain circuitry off to save power) as compared to a conservative service search. An aggressive search can also refer to a way of searching that employs more power consuming resources (e.g., multiple radios) that cause more power consumption compared to a conservative search with same or different search-sleep time pattern as that for a conservative search. An aggressive service search may result in finding service more quickly. However, an aggressive service search performs the search function for a longer period or can employ more power consuming resources and, thus, consumes more power than a conservative service search, which has a shorter search period or less power consuming resources.

A service module 110 can be configured to determine whether service with a network is available. The network or service can be various types of applications (e.g., CDMA, wide-band CDMA, CDMA 1X, GSM, LTE, Wi-Fi, Wimax, Internet technologies, Satellite service, WLL, and so forth). Service module 110 can further detect when service with a network has been lost (or has not been establish in the case where apparatus 102 has just been powered "on"). Service can be lost due to poor connectivity conditions, moving to an area that has limited coverage, different coverage (e.g., a different frequency, a different technology), a roaming network, powering down apparatus 102 and reapplying power in a different geographic area, and so forth.

A connection module 112 is configured to determine whether apparatus 102 is connected to charge unit 108 (e.g., being charged) at substantially the same time as apparatus 102 is powered on (e.g., service is sought) and/or network service is lost or at another time when a search for service will be conducted. In accordance with some aspects, charge unit 108 can be any type of battery charger including, but not limited to a wall mounted charger, a vehicle charger, a charger charging through a Universal Serial Bus (USB) interface, or a connection to a computer.

Further, the connection between the battery and the charger need not be a physical cable connection. Charge unit 108 may also be deemed connected when an external power source is charging apparatus 102 through electromagnetic waves without any physical cable connection. Charge unit 108 may also be deemed connected when a component that converts solar energy into electrical energy is active and is charging battery 106. Further, charge unit 108 may be deemed connected when a component that converts microwave energy is active and is charging battery 106. Thus, any aspects or features described with reference to "connected to charger", "not connected to charger" and the like are intended to comprise physical and non physical connections and such terms can be interchanged with terms such as "being charged" and "not being charged."

Also included in apparatus 102 is a selection module 114 that is configured to determine whether to conduct an aggressive service search, a conservative service search, or a type of service search there between (e.g., a service search ranging between conservative and aggressive). An aggressive search can be conducted when apparatus 102 is connected to charge unit 108 (e.g., when power consumption is less of a concern). If apparatus 102 is not connected to charge unit 108, a conservative service search can be employed.

In an example, if apparatus 104 goes out of service (or is powered on) when charge unit 108 is not connected, selection module 114 chooses a conservative pattern. If apparatus 102 goes out of service or is powered on when charge unit 108 is connected, selection module 114 chooses an aggressive pattern.

Further, if apparatus 102 goes out of service or is powered on when charge unit 108 is not connected, but later a charge unit 108 is connected, selection module 114 switches from a conservative pattern to an aggressive pattern. In another example, if apparatus 102 goes out of service (or is powered on) when charge unit 108 is connected but later the charge unit 108 is removed, selection module 114 switches from an aggressive pattern to a conservative pattern.

Apparatus 102 may use a uniform service search pattern of awake (service search) period and sleep (circuitry off to conserve power) period. When apparatus 102 is being charged (e.g., connected to charge unit 108), the awake period can be longer and the sleep period can be shorter compared to a search when apparatus 102 is not being charged (e.g., not connected to charge unit 108).

A basic fundamental algorithm in the case of a uniform search is that the search pattern comprises of cycles of a fixed search period and a fixed sleep period. As long as apparatus 102 continues to be out of service, apparatus 102 will follow this pattern. For a non-uniform search pattern, if apparatus 102 searches aggressively for a few cycles (e.g., seconds, minutes, and so on) it might be determined that, even after an aggressive search, service still cannot be found. In this case, the aggressive search can migrate toward a more conservative search in order to save power since the chances of finding service in that area have been reduced. In this case, apparatus 102 might switch to a less frequent wakeup (e.g., slowly transition to a less aggressive and/or conservative search pattern).

In accordance with some aspects, the search pattern may be non-uniform. However, with non-uniform search patterns, a greater fraction of time can be spent in service search when charge unit 108 is connected to apparatus 102 as compared to when charge unit 108 is not connected to apparatus 102. Further, with a non-uniform search pattern, the pattern can change sleep duration or search duration or both sleep duration and search duration without a change in status of charger connection.

Additionally, connection module 112 can monitor the status of charge unit 108 (connected or not connected) during service search. When apparatus 102 is out of service, connection or removal of charge unit 108 (an external event) may trigger selection module 114 to switch between aggressive and conservative search patterns.

For example, apparatus 102 goes out of service while connected to charge unit 108. Thus, an initial search is initiated as an aggressive search. While searching for service, charge unit 108 is removed. Based on this change, selection module 114 automatically switches from aggressive searching to conservative searching.

In another example, when apparatus 102 is connected to a vehicle charger and the vehicle is moving in a remote area, service may be lost. Service may be present in the remote area on a different frequency and/or in a roaming network. The service can be quickly regained by an aggressive search pattern so that the user will hardly notice any loss of service.

In a further example, a user travels to a different city or country. Apparatus 102 is switched off in an airplane (or placed in airplane mode). Once arriving at a designation (e.g., home, hotel, and so on) apparatus 102 is connected to a wall mount charger. Typically, regaining service takes more time if the service at the new place is in a different band (such as the PCS (Personal Communications Services) band in the United States and the IMT (International Telecommunications Union) band in Europe). The time taken to regain service can be seriously affected by the duty cycle of the search pattern. For example, a power conservative search with longer sleep time and shorter awake period can take significantly longer time to regain service compared to an aggressive search pattern. This can also have a direct impact on user satisfaction and user experience.

System 100 can include memory 116 operatively coupled to apparatus 102. Memory 116 can be external to apparatus 102 or can reside within apparatus 102. Memory 116 can store information related to evaluating a charger connection status when apparatus 102 is powered on or when network access is lost, choosing a service search pattern as a function of the evaluation, continuing to monitor the charger connection status, modifying the search pattern if the charger connection status changes, and discontinuing the search when network access is established. Memory 116 can also retain other suitable information related to signals transmitted and received in a communication network. A processor 118 can be operatively connected to apparatus 102 (and/or memory 116) to facilitate analysis of information related to service search patterns in a communication network. Processor 118 can be a processor dedicated to analyzing and/or generating information received by apparatus 102, a processor that controls one or more components of system 100, and/or a processor that both analyzes and generates information received by apparatus 102 and controls one or more components of system 100.

Memory 116 can store protocols associated with modifying a service search pattern as a function of a battery charge status or as a function of a manual selection by the user. Further, memory 116 can store protocols associated with taking action to control communication between apparatus 102, other devices, and a network such that system 100 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 2:
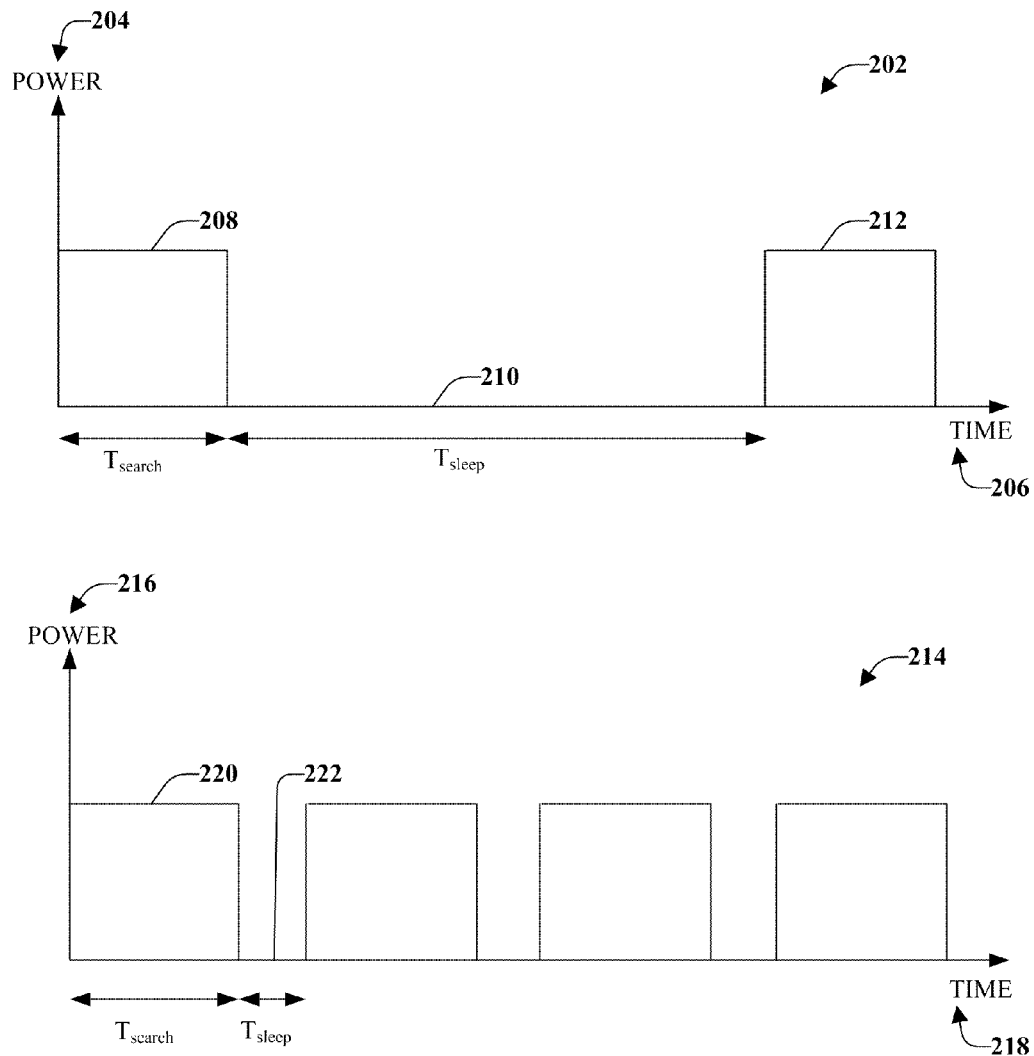
FIG. 2 illustrates example time lines for uniform service search patterns, according to an aspect.

FIG. 2 illustrates example time lines for uniform service search patterns, according to an aspect. An example time line for a conservative uniform search pattern is illustrated at 202. A power conservative search pattern can be utilized when the device is not connected to a charger (e.g., not being charged). Power is represented along the vertical axis 204 and time is represented along the horizontal axis 206. A search time ($T_{search}$) is illustrated at 208 and a period of sleep ($T_{sleep}$) is illustrated at 210. As illustrated, sleep time $T_{sleep}$ 210 is longer than search time $T_{search}$ 208 which can conserve power. At 212 is a subsequent search time $T_{search}$, which can be followed by another sleep time $T_{sleep}$, and so forth. Thus, the uniform conservative search pattern 202 repeats in a similar manner until service is established and/or another external event occurs (e.g., user input, connection to a battery charger, and so forth).

Illustrated at 214 is a uniform aggressive search pattern, which can be utilized when a charger is connected to device (e.g., device is being charged). Power is illustrated along the vertical axis 216 and time is represented along the horizontal axis 218. Search time $T_{search}$ 220 is longer than sleep time $T_{sleep}$ 222. As illustrated, search times and sleep times alternate until an external event occurs (e.g., network service is established, a user input is received, battery charger is removed, and so on).

In an example, when the device is not connected to a charger (e.g., is not being charge), the following conservative uniform search pattern can be used: $T_{search}$ is 6 seconds and $T_{sleep}$ 210 is 54 seconds. When device is connected to a charger (e.g., is being charged), the following aggressive uniform search pattern can be used: $T_{search}$ is 10 seconds and $T_{sleep}$ is 5 seconds. However, this is only an example and other search patterns can be utilized with the disclosed aspects.

Continuing the above example, device loses service on one frequency and that service is available on another frequency at this location. If the device searches through a list of frequencies, it takes device 61 seconds of continuous search to reach the frequency with service (e.g., $T_{sleep}$ is equal to zero). With the conservative search pattern, it will take 601 seconds (e.g., ten minutes between service loss and service remaining) to find the frequency. With the aggressive search pattern, the time between service loss and service regain reduces to 91 seconds (e.g., one and a half minutes).

In accordance with some aspects, device might choose to use a $T_{sleep}$ that is equal to zero (e.g., the uniform search pattern is that of a continuous service search). This search pattern might be utilized when it is known that service is available on a different frequency and/or if an emergency call needs to be made or received.

According to some aspects, $T_{search}$ can be equal to zero in the situation where the device is not searching for service (e.g., device will not be used for a period of time). This search pattern can be selected based on information received from a user and/or based on historical usage patterns (e.g., between 11:30 p.m. and 4 a.m. the device has historically not been used).

In accordance with some aspects, an aggressive search pattern can have the same schedule as a conservative search pattern. For example, the periods of sleep and the periods of awake can be the same duration for both the aggressive search pattern and the conservative search pattern. However, the aggressive search pattern can spend more power in the search period compared to the conservative search pattern. This can be performed by (but not limited to) using multiple radios to search different frequencies at substantially the same time.

Figure 3:
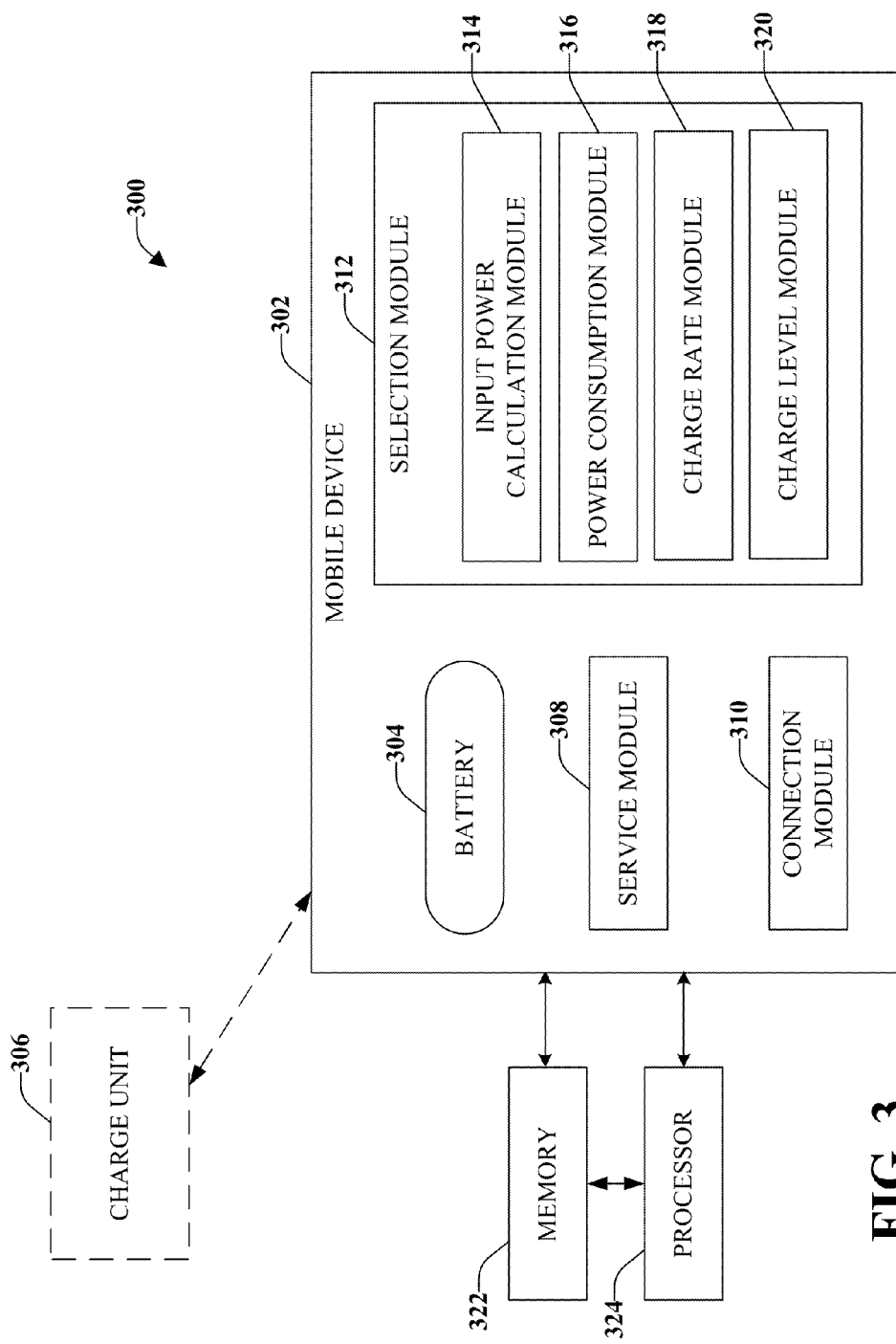
FIG. 3 illustrates a system for selectively changing a service search pattern, according to an aspect.

FIG. 3 illustrates a system 300 for selectively changing a service search pattern, according to an aspect. System 300 includes a mobile device 302 that is configured to modify a service search pattern as a function of a charge status. Device 302 includes a battery 304 that can be operatively connected to a charge unit 306. The charge unit 306 can be a wall mount charger, a charger in a vehicle, charging of device 302 through a connection (e.g., USB cable) to a computer, and so forth. Further, battery 304 can be disconnected from charge unit 306. In accordance with some aspects, the connection between battery 304 and charge unit 306 need not be a physical cable connection. Charge unit 306 may also be deemed connected when an external power source is charging mobile device 302 through electromagnetic waves without any physical cable connection. Charge unit 306 may also be deemed connected when a component that converts solar energy (and/or microwave charging) into electrical energy is active and is charging battery 304.

A service module 308 can determine whether a connection with a network has been lost (e.g., device 302 goes out of service) and/or whether a connection with a network has been established or re-established (e.g., device 302 obtains service connectivity). In accordance with some aspects, device 302 can go out of service of a first network type and re-establish service with a second network type. Thus, device 302 can have functionality to communicate with a plurality of network types (e.g., Wi-Fi, GSM, CMDA, Internet, and so forth).

A connection module 310 is configured to determine whether battery 304 is operatively connected to charge unit 306. The determination by connection module 310 can be made when service with the network is lost or at any other time (e.g., while device 302 is connected to a network, while device 302 is searching for a network, and so forth).

If mobile device 302 has lost a network connection, a selection module 312 can determine a network search pattern to utilize in order to re-establish a network connection (or to establish a network connection in the case of power up). In accordance with some aspects, the network connection can be re-established with the same (or a similar) network, or a different network. Selection module 312 can include an input power calculation module 314, a power consumption module 316, a charge rate module 318, and a charge level module 320.

Input power calculation module 314 is configured to determine the amount of power that is input by charger 306. Power consumption module 316 is configured to ascertain an amount of power being consumed during service search. If the power consumption is excessive, selection module 312 can employ a more conservative search.

Charge rate module 318 is configured to determine an acceptable rate of battery charge. If the battery is not charging at an appropriate rate, a search pattern might be changed from an aggressive search pattern to a less aggressive search pattern. If a portion of the power input from charge unit 306 is being used for service search, then it might take a little longer to charge battery 304 completely. However, the increase in time to charge battery 304 should be minimal.

Charge level module 320 can be configured to analyze a battery charge level and make a determination whether the level of battery charge is acceptable or not acceptable. In accordance with some aspects, the charge rate of the battery and the charge level can be utilized by selection module 312 to change a search pattern. For example, if the battery level is 10%, an acceptable rate of charging the battery should be high. Thus, if the charge rate is 1% every hour (and the battery level is 10% or lower), this charge rate is not acceptable. However, if the battery level is 90% and device 302 goes out of service, then the charging rate can be 1% every hour since the battery level is acceptable. These parameters are analyzed by selection module 312 to avoid the situation where device 302 goes out of service while connected to charge unit 306, however, the charge rate is not acceptable and, thus, once device 302 is taken off charge, the battery is drained.

The modules 314, 316, 318, and 320 can be utilized separately, together, or in any combination in order for selection module 312 to determine which network search pattern to utilize. Thus, more than one factor can be analyzed by selection module 312 to determine whether a search pattern is appropriate or whether changes should be made to the search pattern.

System 300 can also include a memory 322 and a processor 324. Memory 322 can retain instructions related to searching for network service as a function of a battery charge status according to the various aspects presented herein. Processor 324 is operatively connected to memory and configured to execute the instructions retained in memory 322.

Figure 4:
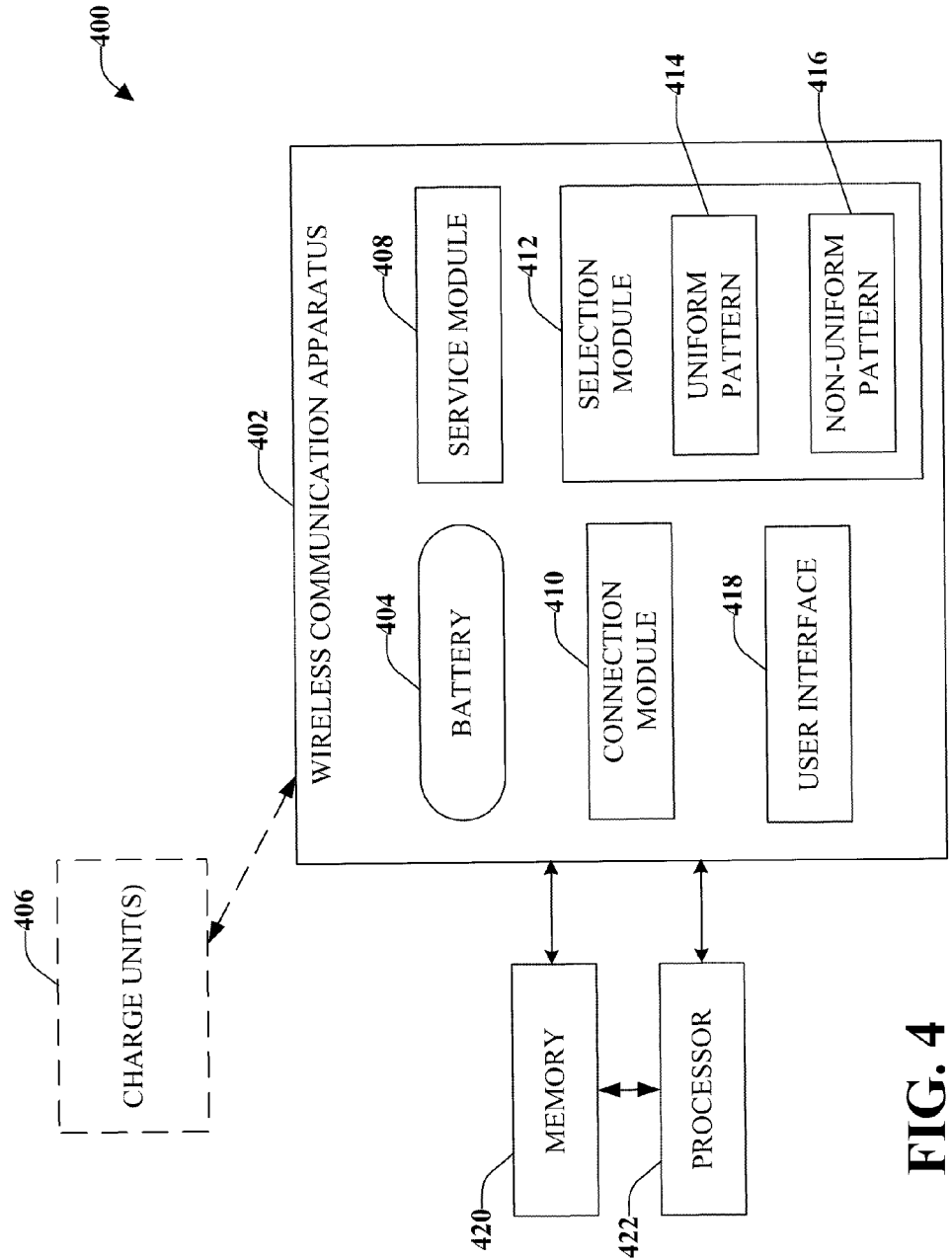
FIG. 4 illustrates a system for selectively modifying a service search pattern, according to one or more aspects.

FIG. 4 illustrates a system 400 for selectively modifying a service search pattern, according to one or more aspects. System 400 is similar to the above figure and includes a communication apparatus 402 that includes a battery 404 that is operatively connected (and disconnected) from various charge units 406. A service module 408 determines whether service has been lost, has not been obtained (e.g., apparatus 402 has just been powered "on") and/or whether service has been obtained or re-obtained. The service lost and the service regained can be different services according to some aspects.

Also included in apparatus 402 is a connection module 410 that is configured to continuously monitor (or based on another frequency) the connection/disconnection of the charge unit 406. The determination by connection module 410 can be made even if apparatus 402 is in sleep mode at the time service is lost. As a function of whether the charge unit 408 is connected (e.g., is being charged even in absence of a physical connection) or not connected (e.g., is not being charged), a selection module 412 selectively alters a service search pattern in order to conserve power while attempting to regain (or acquire) service in a shortest possible amount of time.

For example, when charge unit 408 is removed from apparatus 402 (e.g., apparatus 402 is no longer being charged), selection module 412 can switch from an aggressive search pattern to a conservative search pattern. If no charge unit 408 was connected (or in the absence of a physical connection, apparatus 402 was not being charged) when apparatus 402 went out of service, selection module 412 can start searching with a conservative search pattern and can switch to an aggressive search pattern if charge unit 408 becomes connected (or when device is being charged).

Selection module 412 may use a uniform search pattern 414 or a non-uniform search pattern 416. Uniform search pattern 414 employs a uniform or constant pattern of wake periods and sleep periods. In accordance with some aspects, the wake period can be longer than the sleep period (e.g., aggressive search). However, in accordance with other aspects, the sleep period can be longer than the wake period (e.g., conservative search). Non-uniform search pattern 416 can selectively change the periods of sleep and wake to change the duty cycle. With non-uniform search pattern 416, the fraction of time spent in service search when charge unit 406 is connected (e.g., apparatus 402 is being charged) as compared to when charger 406 is not connected (e.g., apparatus 402 is not being charged) can be dynamically altered from one duty cycle to a next duty cycle. In accordance with some aspects, a conservative search pattern and an aggressive search pattern can have a similar time schedule. However, the aggressive search pattern spends more power in the search period compared to the conservative search pattern.

A user interface 418 is provided that allows a user to communicate with apparatus 402. User interface 418 can be a graphical user interface (GUI), a command line interface, a speech interface, Natural Language text interface, and the like. Regardless of the search pattern utilized (e.g., aggressive, conservative, or any state there between, uniform 414, non-uniform 416, and so forth), a user input or intervention can cause the search pattern to be interrupted. For example, a search pattern includes 5 seconds of search, followed by 40 seconds of sleep. If after 20 seconds of sleep the user intervenes (e.g., presses a key), apparatus 402 can come out of sleep mode and start searching for service at that point (without waiting for the remaining 40 seconds to elapse).

Alternatively or additionally, a user can selectively change a search pattern though interaction with user interface 418. For example, a user can select a pattern with varying amounts of duty cycles (e.g., 40% duty cycle, 20% duty cycle, 70% duty cycle, and so forth) or different values of sleep and search periods.

In accordance with some aspects, messages or prompts can be presented (e.g., verbal, visual, and so on) to the user through user interface 418. A message or prompt can provide such information as: "Your battery is fully charged, would you like the mobile to do a more aggressive search?" "Would you like a less aggressive search?" (search pattern is user configurable).

In another example, the user can be presented with a prompt such as "Device is out of service, but there is only 5% battery level remaining. How would you like to proceed?" The user may choose to forgo service search completely (e.g., a search period of zero seconds). However, in this case, even if there is only 5% battery level remaining, the user might need to initiate an emergency call. Thus, the emergency call will override a conservative search and an aggressive search for service will be conducted in order to obtain service for the emergency call as soon as possible.

In accordance with some aspects, if device 402 is going out of service, a prompt can be sent to the user. If a reply is received, device 402 proceeds according to the user's instruction. If there is no reply received in a predetermined period of time, selection module (or another component) can calculate its own search pattern and use that pattern to conduct the search.

In another example, if after a service search the battery level falls below a certain threshold, the user can be prompted for instructions on how to proceed. If no input is received from the user after a defined amount of time and a non-uniform search pattern is not allowed, apparatus 402 can continue with a previous search pattern. If no input is received (after a defined amount of time) and a non-uniform search pattern is allowed, apparatus 402 can calculate a search pattern and utilize that search pattern to conduct a further search.

In a further example, the battery level is below a threshold however, the user does not plan to use the device for a while (e.g., the user is going to sleep). In this case, the user can indicate that the phone will not be in use. Thus, it might be determined that, since the battery level is low (or a charger is not connected) a search will not be conducted until further input is received from the user and/or for a certain period of time (e.g., 8 hours) or until a certain time (e.g., 6:30 a.m.).

System 400 can also include a memory 420 and a processor 422. Memory 420 can retain instructions related to searching for network service utilizing a uniform search pattern or a non-uniform search pattern. Memory 420 can also store instructions related to prompting a user for input and receiving/processing the user input. Processor 422 is operatively connected to memory and is configured to execute the instructions retained in memory 420.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
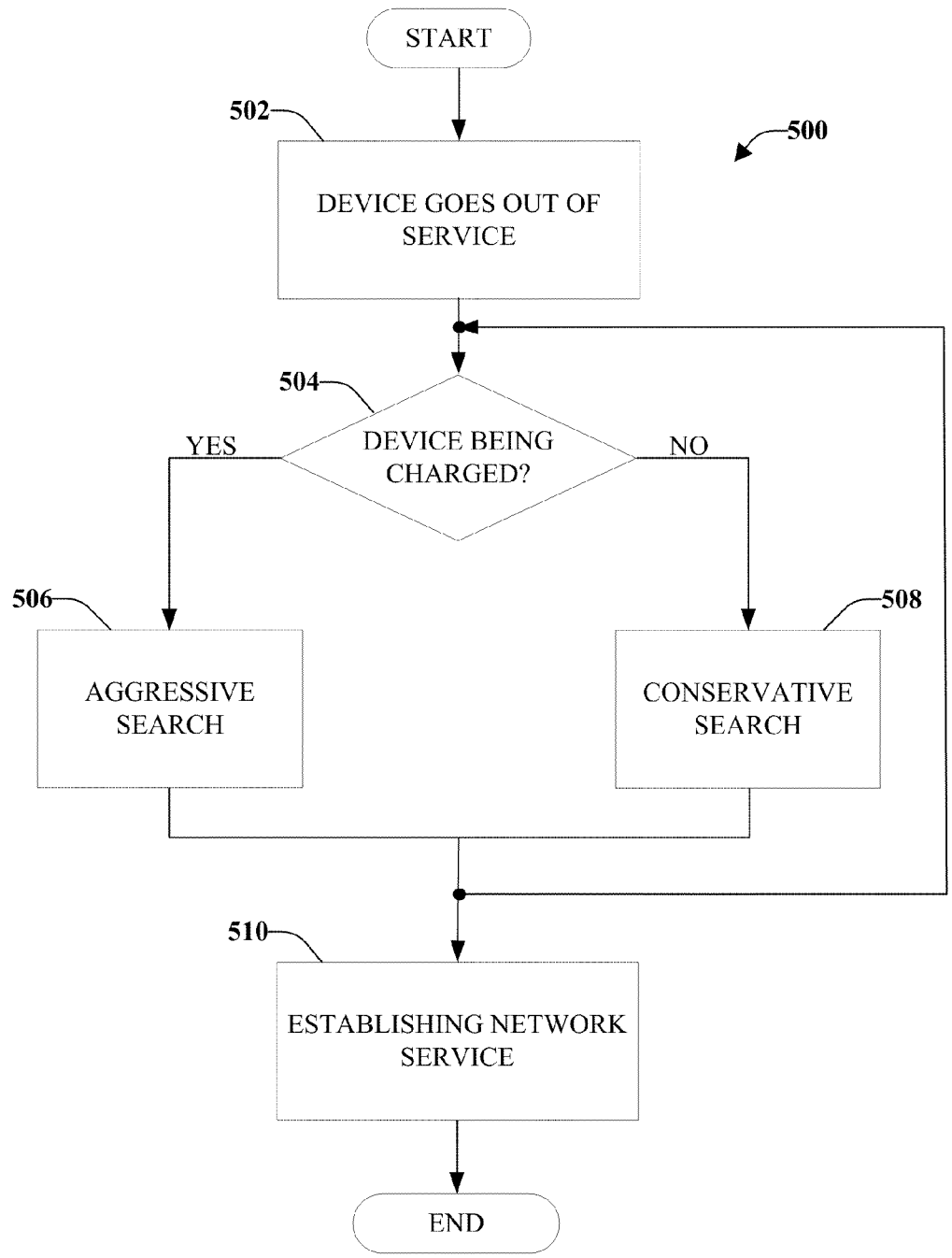
FIG. 5 illustrates a method for selectively searching for network service in a wireless communications network, according to an aspect.

FIG. 5 illustrates a method 500 for selectively searching for network service in a wireless communications network, according to an aspect. Method 500 can be employed by a mobile device that employs a processor to carry out method 500. At 502, device goes out of service or, in accordance with some aspects, when device is powered "on". A loss of service can be due to a variety of reasons including moving to a remote area, moving to an area where signal strength is weak, travel to a different geographic area, and so forth. Further loss of service can be encountered while device is camped on the network, in use, and/or when device is in a sleep or low power mode (e.g., device is not in use).

At 504, a determination is made whether device is being charged (e.g., connected to a battery charger) when network connectively is lost (or when device is powered on). If the device is being charged ("YES"), at 506, an aggressive search for a network connection is performed. If the device is not being charged ("NO"), a conservative search is performed, at 508. An aggressive search pattern comprises a search period that is longer than a sleep period. A conservative search pattern comprises a search period that is shorter than a sleep period. In accordance with some aspects, the search pattern can be any type of search pattern between conservative and aggressive. In accordance with some aspects, the search pattern can be uniform. However, in accordance with other aspects, the search pattern can be non-uniform. Alternatively or additionally, the search pattern can change between uniform and non-uniform as a function of battery status. Further, in accordance with some aspects, both the aggressive search and the conservative search can have a similar time schedule (e.g., periods of wake and sleep), however, the aggressive search consumes more power in the search period compared to the power consumed by the conservative search pattern.

At 510, network service is established and method 500 ends. The network can be established with the network that was previously utilized or a different network. In accordance with some aspects, method 500 can continue with continuous monitoring of status of a battery charger, at 504, if network service is not established, at 510. If a change is detected, the type of search pattern utilized can be automatically changed.

Figure 6:
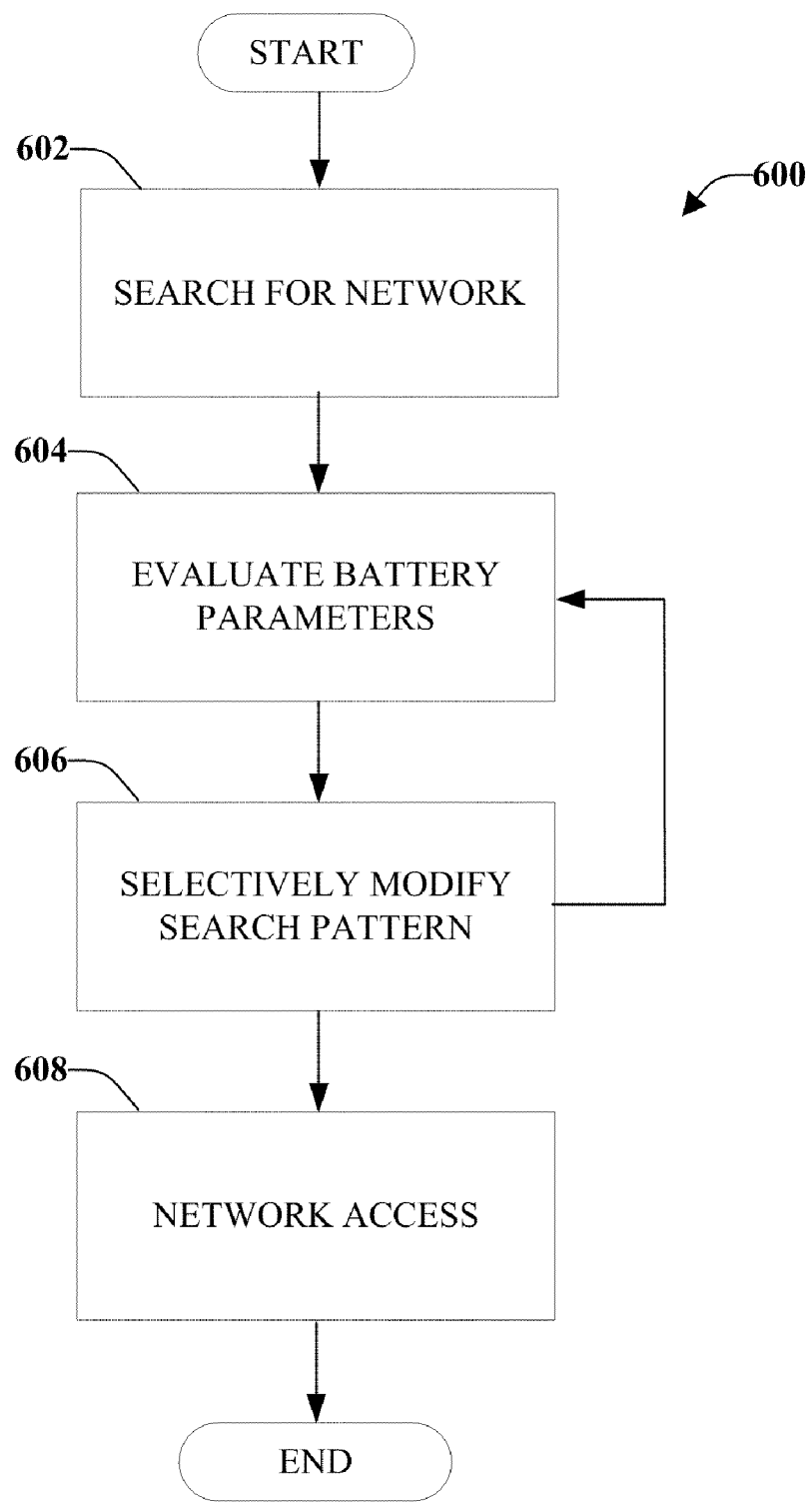
FIG. 6 illustrates a method for selectively modifying a service search pattern during a search, according to an aspect.

FIG. 6 illustrates a method 600 for selectively modifying a service search pattern during a search, according to an aspect. At 602, a network search is conducted utilizing a search pattern that was selected as a function of whether or not device is being charged. If not being charged, the search pattern can be conservative so that the battery charge level is not drained quickly. If the battery is being charged, the search pattern selected can be more aggressive.

At 604, battery parameters are evaluated. The battery parameters can include the amount of power being input by the battery charger. If the input power is low, it might indicate that the battery charger is not effective and, thus, is not charging the battery properly. In this situation, a less aggressive search might be switched to, at 606.

Another battery parameter includes power being consumed during service search. If the search is too aggressive (e.g., a long amount of search time with a small amount of sleep time, a large amount of power being consumed during service search), the search might be drawing too much power from the battery. Therefore, the search might be modified, at 606, to a less aggressive search. In another example, the power being consumed during the search might be minimal (e.g., a very conservative search pattern). In this case, the search might be modified, at 606, to a more aggressive search, wherein service might be found quicker.

Another battery parameter is an acceptable rate of charging the battery. The charging rate threshold can be determined as a function of a charge level present in the battery or independent of the charge level present in the battery. The battery charging rate can be compared to the rate of battery charging to determine a type of search pattern to use (e.g., conservative, aggressive, or there between). For example, if the charge rate is high, a more aggressive search pattern can be applied, at 606. However, if the charge rate is low, a less aggressive search pattern should be applied, at 606. Switching to the less aggressive search pattern can mitigate the chance that the battery is charging at a level that is smaller than the energy consumed for the search (which would result in a drain on the battery).

Yet another battery parameter is a current battery level. For example, if the battery level is at 10% when device goes out of service, and device is being charged, an aggressive search can be applied. Then the battery charges to 80% and the charger is disconnected (e.g., device is no longer being charged). Thus, at 606, since there is 80% of charge remaining, the search pattern might be switched to a conservative search, but not a very conservative search (e.g., closer to the midrange between aggressive and conservative). Thus, the search pattern can be recalculated, at 606 to accommodate the detected changes. As illustrated, battery parameters are periodically (or based on another frequency) monitored, at 604, to determine if a search pattern should be modified, at 606.

At 608, a network connection is established and method 600 ends. In accordance with some aspects, an external event changes the search pattern. For example, the external event can be a user input that indicates the user would like to perform some function with device. In this situation, if the search pattern is in the middle of a sleep time, the sleep time will be interrupted and searching for service will occur. In accordance with some aspects, the user input can cause method 600 to switch to a more aggressive search, especially if an emergency call is being made.

Figure 7:
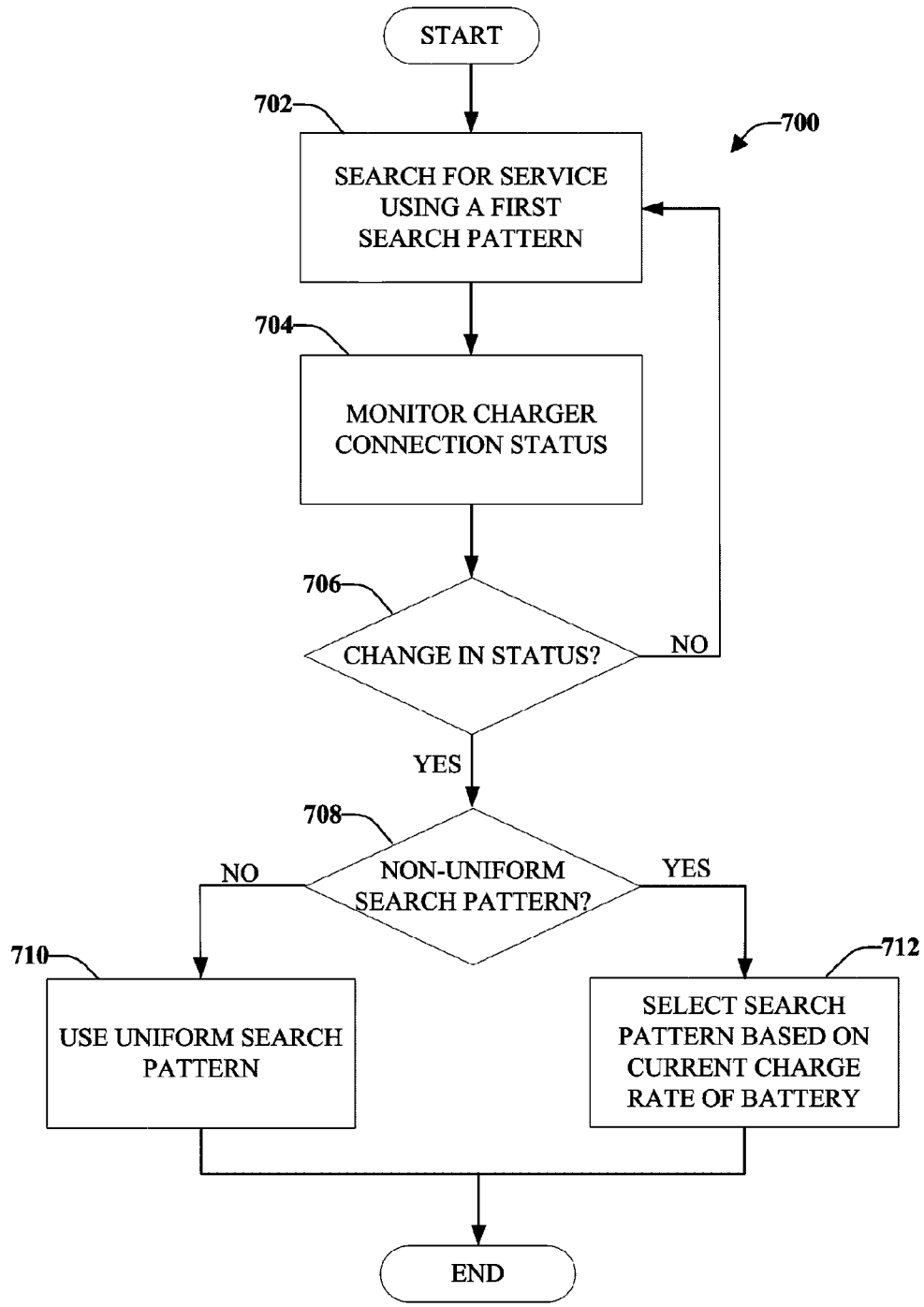
FIG. 7 illustrates a method for selecting a uniform or a non-uniform network search pattern as a function of a battery charge state, according to an aspect.

FIG. 7 illustrates a method 700 for selecting a uniform or a non-uniform network search pattern as a function of a battery charge state, according to an aspect. Method 700 starts, at 702, where a search pattern is selected from a multitude of search patterns (e.g., uniform, non-uniform, conservative, aggressive, or somewhere between conservative and aggressive, and so on). The search pattern was selected as a function of whether the device battery is currently being charged. While searching for service, continuous monitoring of connection/disconnection (e.g., charging/not charging) of the battery is conducted, at 704. Based on this continuous monitoring, a determination is made, at 706, whether there is a change in the charger status (e.g., charger has been connected, charger has been disconnected, battery is being charged, battery is not being charged). If there is no change in status ("NO"), method 700 continues, at 702, with searching and monitoring of the battery status (until service is found).

If the determination, at 706, is that there is a change in status, at 708, a determination is made whether a non-uniform search pattern is allowed for this device. If not allowed ("NO"), the pattern remains uniform, at 710, and removal of the battery charger (e.g., battery is no longer being charged) changes the pattern from aggressive search to non-aggressive (or conservative) search. For a uniform search and the battery charger is connected (e.g., battery is being charged), the pattern can change from non-aggressive search to aggressive search.

If the determination, at 708, is that non-uniform search is allowed ("YES"), at 712, the search pattern is selected based on a current charge level of the battery, which can be applied whether the charger is connected (e.g., battery is being charged) or is not connected (e.g., battery is not being charged). For example, if the battery charge level is 10% and the charger is connected, the pattern can be aggressive. As the battery charge level increases, the pattern can become more aggressive. When the charger is not connected (e.g., battery is not being charged) and the pattern is conservative, the battery charge level can slowly decrease and in proportion to this decrease, the conservative search pattern can become more conservative. Thus, a telescoping algorithm can be applied as a function of whether the battery is being charged and a current charge level of the battery when a non-uniform search pattern is applied.

Figure 8:
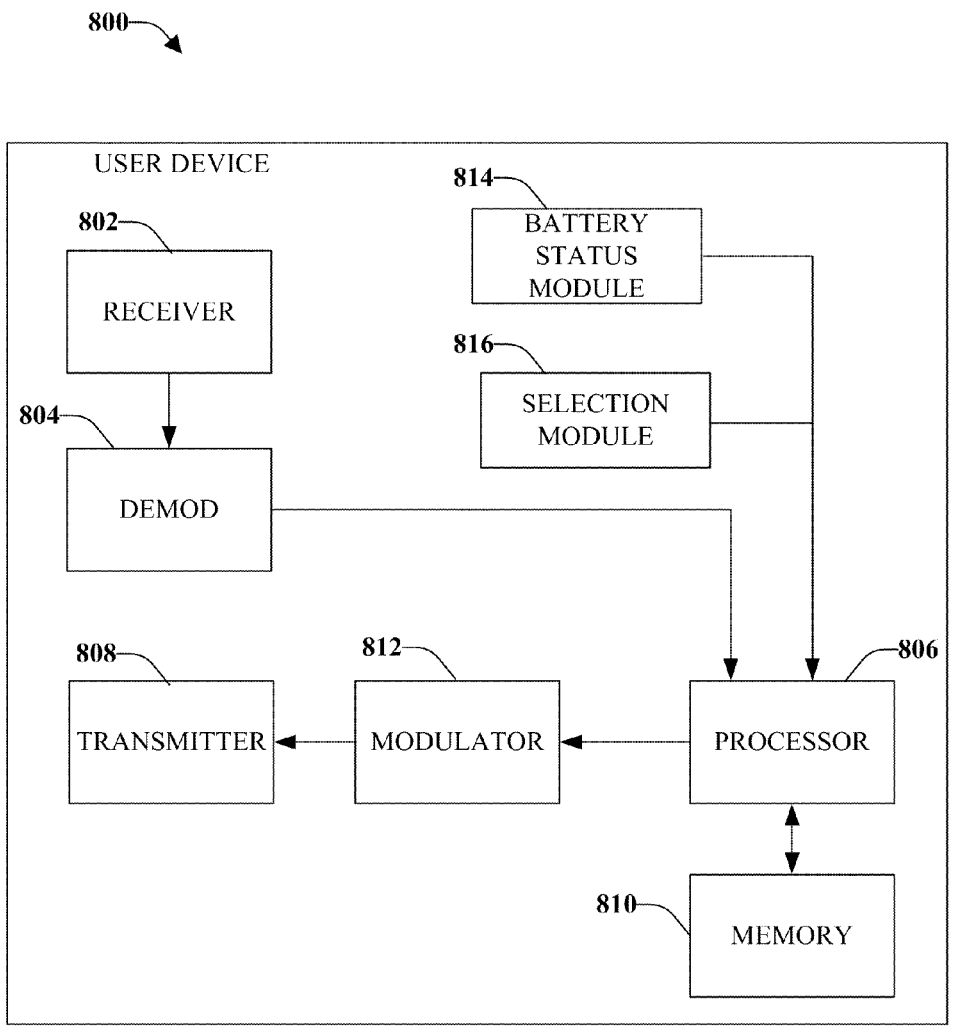
FIG. 8 illustrates a system that facilitates selection of a service search pattern as a function of a battery charge state, in accordance with one or more of the disclosed aspects.

With reference now to FIG. 8, illustrated is a system 800 that facilitates selection of a service search pattern as a function of a battery charge state in accordance with one or more of the disclosed aspects. System 800 can reside in a user device. System 800 comprises a receiver 802 that can receive a signal from, for example, a receiver antenna. The receiver 802 can perform typical actions thereon, such as filtering, amplifying, downconverting, etc. the received signal. The receiver 802 can also digitize the conditioned signal to obtain samples. A demodulator 804 can obtain received symbols for each symbol period, as well as provide received symbols to a processor 806.

Processor 806 can be a processor dedicated to analyzing information received by receiver component 802 and/or generating information for transmission by a transmitter 808. In addition or alternatively, processor 806 can control one or more components of user device 800, analyze information received by receiver 802, generate information for transmission by transmitter 808, and/or control one or more components of user device 800. Processor 806 may include a controller component capable of coordinating communications with additional user devices.

User device 800 can additionally comprise memory 808 operatively coupled to processor 806 and that can store information related to coordinating communications and any other suitable information. Memory 810 can additionally store protocols associated with service search patterns. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and/or methods is intended to comprise, without being limited to, these and any other suitable types of memory. User device 800 can further comprise a symbol modulator 812 and a transmitter 808 that transmits the modulated signal.

User device 800 includes a battery status module 814 that is configured to observe a status of the battery. The status can include whether the battery is being charged or is not being charged. Further, the battery status can include a charge rate (e.g., how fast the battery is charging, how fast the battery is losing a charge, and so on). Alternatively or additionally, the battery status can include a current charge percentage or level. A selection module 816 is configured to utilize a search pattern as a function of the battery status. The search pattern can range from conservative to aggressive. In accordance with some aspects, the search pattern can be uniform or non-uniform, or can switch between uniform and non-uniform, or any state there between.

Figure 9:
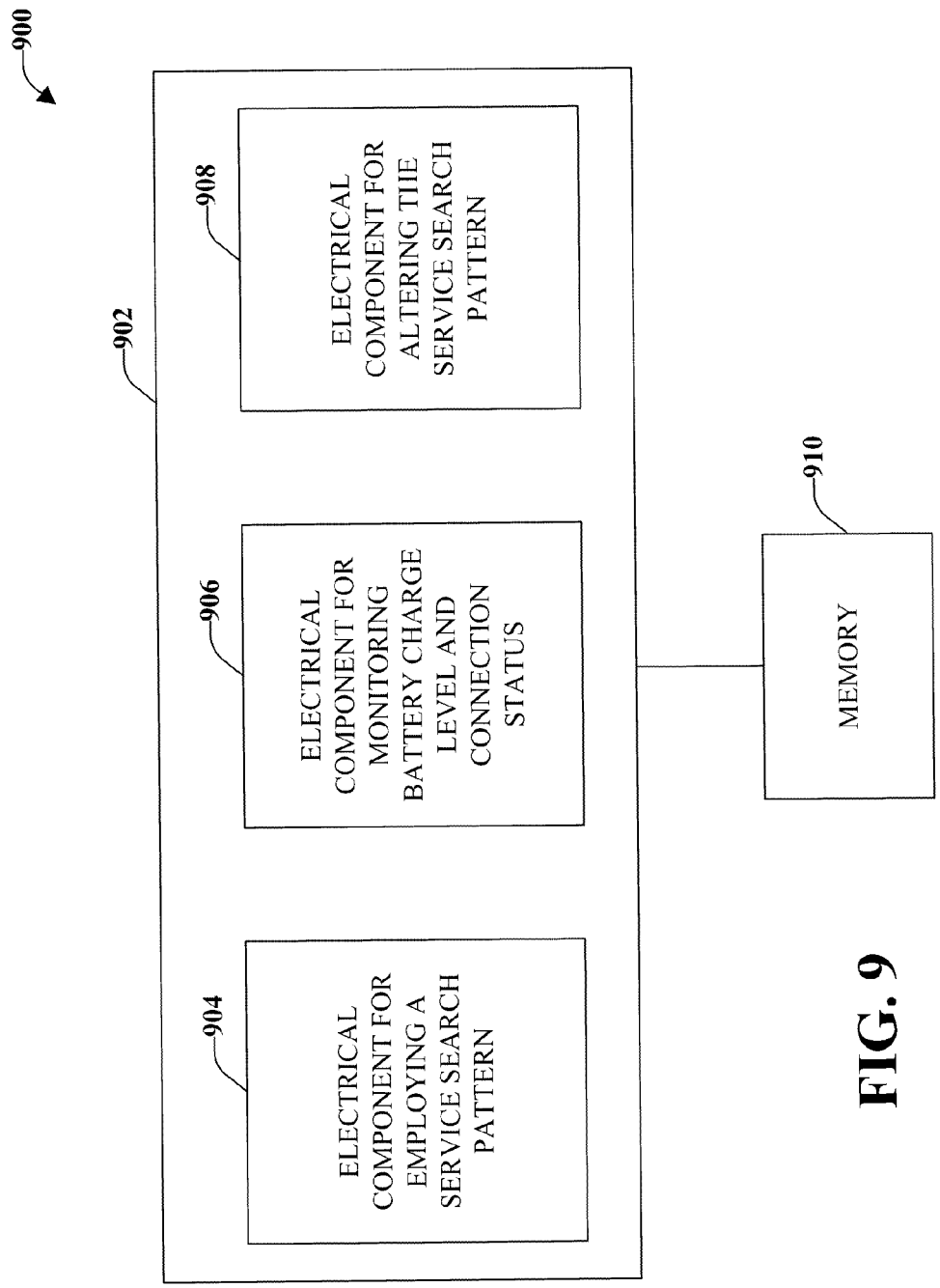
FIG. 9 illustrates an example system that selects a network search pattern as a function of a battery charge state, according to an aspect.

With reference to FIG. 9, illustrated is an example system 900 that selects a network search pattern as a function of a battery charge state, according to an aspect. For example, system 900 may reside at least partially within a mobile device. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 includes an electrical component 904 for employing a service search pattern based on a battery charging status (e.g., being charged, not being charged). Logical grouping 902 also includes an electrical component 906 for monitoring status of the battery charge level and the charging status. Electrical component 906 can observe at least one of an amount of power input by the charger, a level of power consumed during the service search, an acceptable battery charge rate, and a current battery power level. Also included in logical grouping 902 is an electrical component 908 for altering the service search pattern if the monitoring indicates a change to the battery charge level status or charging status. The service search is terminated when a service connection is established.

In accordance with some aspects, electrical component 906 for monitoring the status of the battery charge level and the charging status can determine if the charging status changes from being charged to not being charged. If changed, electrical component 908 for altering the service search pattern switches from an aggressive service search pattern to a non-aggressive service search pattern.

According to some aspects, electrical component 906 for monitoring the status of the battery charge level and the charging status determines if the charging status changes from not being charged to being charged. If changed, electrical component 908 for altering the service search pattern switches from a non-aggressive service search pattern to an aggressive service search pattern.

According to some aspects, the aggressive search pattern comprises a greater search time to sleep time ratio compared to that of a conservative search pattern. In accordance with some aspects, the aggressive search pattern consumes more power in a search period than a conservative search pattern irrespective of search time to sleep time ratio. For example, an aggressive search pattern can have a search period of ten seconds and a sleep period of thirty seconds and a conservative search pattern has a search period of five seconds and a sleep period of thirty seconds. In this example, the aggressive search pattern has a search period that is shorter than a sleep period. In another example, an aggressive search pattern has a search period of ten seconds and a sleep period of five seconds and a conservative search pattern has a search period of six seconds and a sleep period of five seconds. In this example, the conservative search pattern has a search period that is longer than the sleep period. Thus, the aggressive and conservative search patterns are not necessarily defined by an absolute relation between search and sleep period but by a difference between their ratios.

Additionally, system 900 can include a memory 910 that retains instructions for executing functions associated with electrical components 904, 906, and 908 or other components. While shown as being external to memory 910, it is to be understood that one or more of electrical components 904, 906, and 908 may exist within memory 910.

Figure 10:
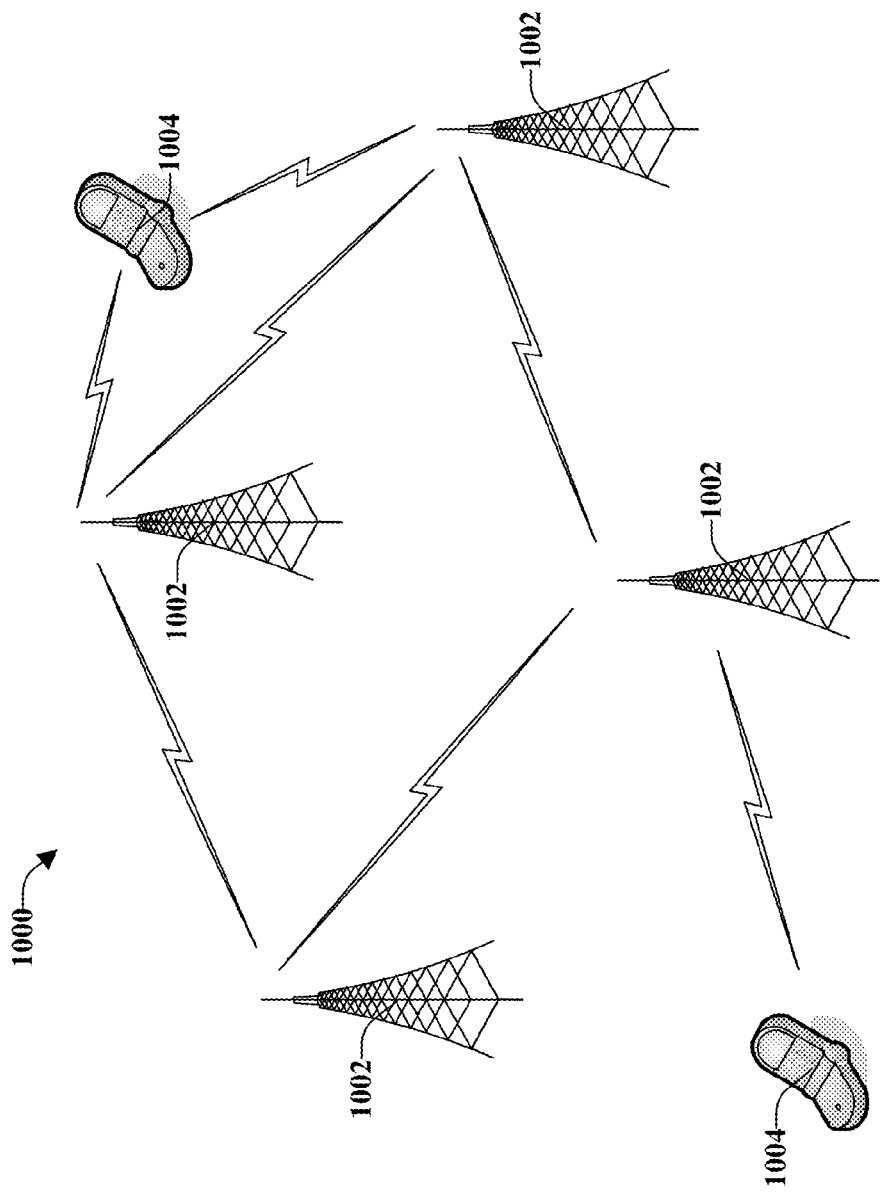
FIG. 10 illustrates a wireless communication system in accordance with various aspects presented herein.

Referring now to FIG. 10, illustrated is a wireless communication system 1000 in accordance with various aspects presented herein. System 1000 can comprise one or more base stations 1002 in one or more sectors that receive, transmit, repeat, and so forth, wireless communication signals to each other and/or to one or more mobile devices 1004. Each base station 1002 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 1004 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and so on), as will be appreciated by one skilled in the art.

Figure 11:
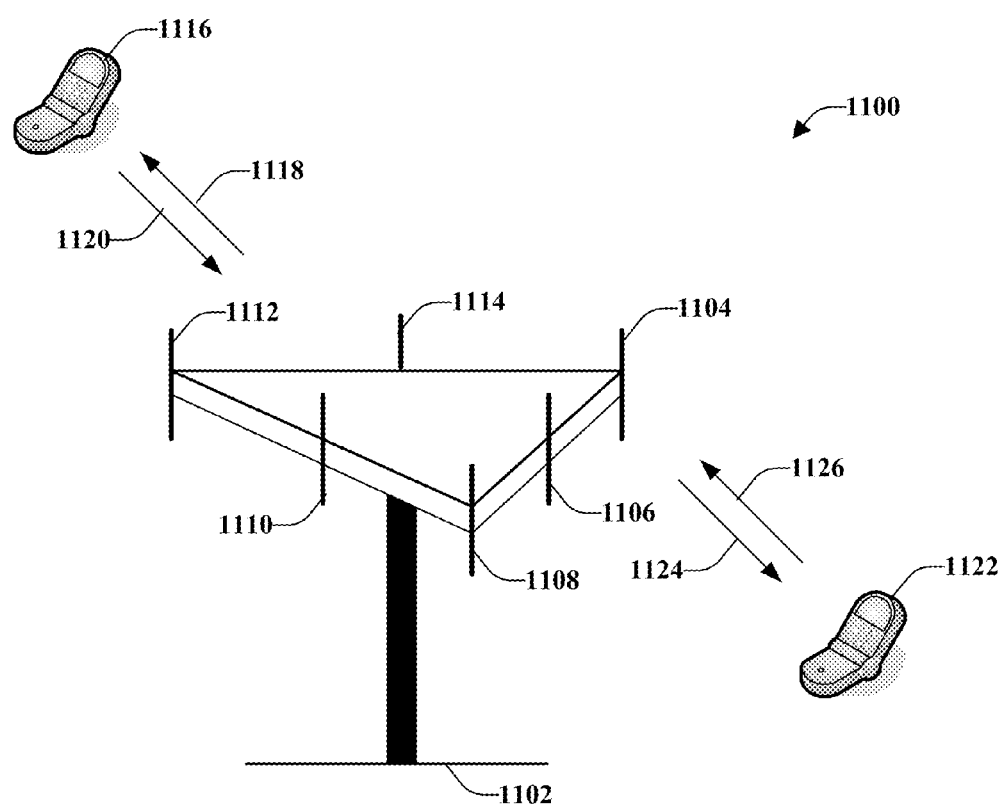
FIG. 11 illustrates a multiple access wireless communication system according to one or more aspects.

Referring now to FIG. 11, a multiple access wireless communication system 1100 according to one or more aspects is illustrated. A wireless communication system 1100 can include one or more base stations in contact with one or more user devices. Each base station provides coverage for a plurality of sectors. A three-sector base station 1102 is illustrated that includes multiple antenna groups, one including antennas 1104 and 1106, another including antennas 1108 and 1110, and a third including antennas 1112 and 1114. According to the figure, only two antennas are shown for each antenna group, however, more or fewer antennas may be utilized for each antenna group. Mobile device 1116 is in communication with antennas 1112 and 1114, where antennas 1112 and 1114 transmit information to mobile device 1116 over forward link 1118 and receive information from mobile device 1116 over reverse link 1120. Forward link (or downlink) refers to the communication link from the base stations to mobile devices, and the reverse link (or uplink) refers to the communication link from mobile devices to the base stations. Mobile device 1122 is in communication with antennas 1104 and 1106, where antennas 1104 and 1106 transmit information to mobile device 1122 over forward link 1124 and receive information from mobile device 1122 over reverse link 1126. In a FDD system, for example, communication links 1118, 1120, 1124, and 1126 might utilize different frequencies for communication. For example, forward link 1118 might use a different frequency than the frequency utilized by reverse link 1120.

Each group of antennas and/or the area in which they are designated to communicate may be referred to as a sector of base station 1102. In one or more aspects, antenna groups each are designed to communicate to mobile devices in a sector or the areas covered by base station 1102. A base station may be a fixed station used for communicating with the terminals.

In communication over forward links 1118 and 1124, the transmitting antennas of base station 1102 can utilize beam forming in order to improve a signal-to-noise ratio of forward links for the different mobile devices 1116 and 1122. Also, a base station utilizing beam forming to transmit to mobile devices scattered randomly through its coverage area might cause less interference to mobile devices in neighboring cells than the interference that can be caused by a base station transmitting through a single antenna to all the mobile devices in its coverage area.

Figure 12:
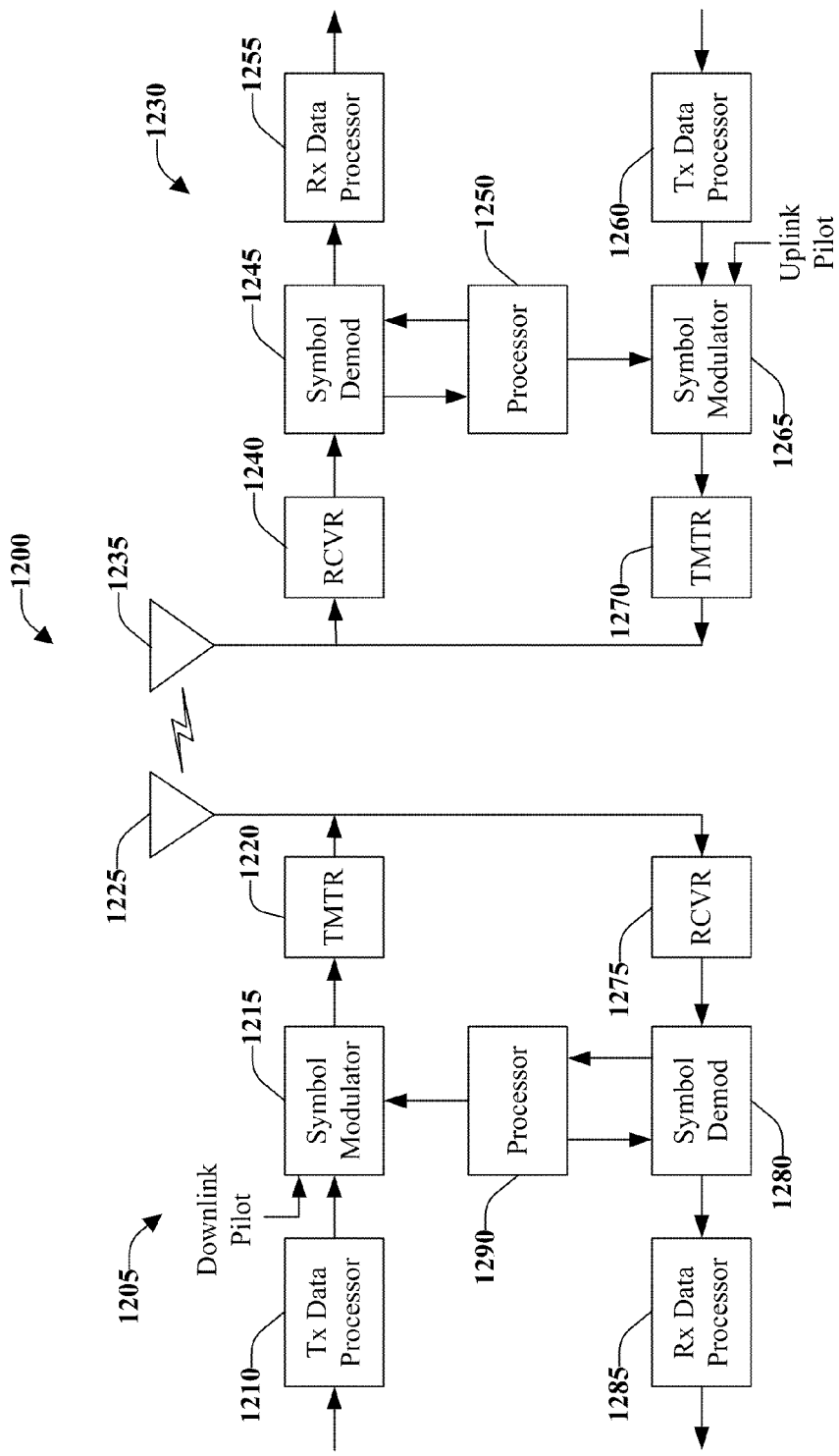
FIG. 12 illustrates an exemplary wireless communication system, according to various aspects.

FIG. 12 illustrates an exemplary wireless communication system 1200, according to various aspects. Wireless communication system 1200 depicts one base station and one terminal for sake of brevity. However, it is to be appreciated that system 1200 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 12, on a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1215 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 obtains N received symbols and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205.

At access point 1205, the uplink signal from terminal 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by terminal 1230. A processor 1280 performs channel estimation for each active terminal transmitting on the uplink.

Processors 1280 and 1250 direct (e.g., control, coordinate, manage, . . . ) operation at access point 1205 and terminal 1230, respectively. Respective processors 1280 and 1250 can be associated with memory units (not shown) that store program codes and data. Processors 1280 and 1250 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1280 and 1250.

It is to be understood that the aspects described herein may be implemented by hardware, software, firmware, or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-85 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method performed by a mobile device for searching for service in a wireless communications network, comprising:
    employing a processor to implement the following acts:
    determining a battery charging status when a network connection is lost;
    selecting a network search pattern as a function of the battery charging status, wherein the network search pattern is interrupted based on an external event, and the external event is a change from not being charged to being charged, a change from being charged to not being charged, or a user input;
    searching for service with the selected network search pattern; and
    establishing a connection with the network or a different network.

2. The method of claim 1, wherein the network search pattern is an aggressive search pattern, a conservative search pattern, or a search pattern there between.

3. The method of claim 2, wherein the aggressive search pattern comprises a greater search time to sleep time ratio compared to that of a conservative search pattern.

4. The method of claim 2, wherein the aggressive search pattern consumes more power in a search period than a conservative search pattern irrespective of a search time to sleep time ratio.

5. The method of claim 1, wherein an aggressive network search pattern is employed if the battery is being charged.

6. The method of claim 1, wherein a conservative network search pattern is employed if the battery is not being charged.

7. The method of claim 1, further comprising:
    monitoring the status of the battery charging while searching for service; and
    changing the selected network search pattern if there is a change to the battery charging status.

8. The method of claim 7, wherein the monitoring observes at least one of an amount of power input by the battery charger, a level of power consumed during the service search, an acceptable battery charge rate, and a current battery power level.

9. The method of claim 7, wherein the monitoring determines the battery charging status changes between a being charged status and a not being charged status, and the changing switches between an aggressive service search pattern corresponding to the being charged status and a non-aggressive service search pattern corresponding to the not being charged status.

10. The method of claim 1, further comprising:
    evaluating a battery charge level; and
    selectively modifying the selected network search pattern as a function of the battery charge level.

11. The method of claim 1, further comprising:
    evaluating a rate of battery charging;
    determining a charging rate threshold as a function of a charge level present in the battery or independent of the charge level present in the battery;
    comparing the rate of battery charging to a rate threshold; and
    using a conservative search pattern if the rate is below the rate threshold or an aggressive search pattern if the rate is at or above the rate threshold.

12. The method of claim 1, wherein the network search pattern is a uniform search pattern or a non-uniform search pattern.

13. A wireless communications apparatus, comprising:
    a memory that retains instructions related to evaluating a battery charging status when apparatus is powered on or when network access is lost, choosing a service search pattern as a function of the evaluation, wherein the service search pattern is interrupted based on an external event, and the external event is a change from not being charged to being charged, a change from being charged to not being charged, or a user input, continuing to monitor the battery charging status, modifying the search pattern if the battery charging status changes, and discontinuing the search when network access is established; and
    a processor, coupled to the memory, configured to execute the instructions retained in the memory.

14. The wireless communications apparatus of claim 13, wherein the service search pattern is aggressive if the battery charging status is charging and the service search pattern is conservative if the battery charging status is not charging.

15. The wireless communications apparatus of claim 14, wherein the aggressive search pattern has a greater search time to sleep time ratio compared to that in a conservative search pattern.

16. The wireless communications apparatus of claim 14, wherein the aggressive search pattern spends more power in a search period compared with the conservative search pattern irrespective of a search time to sleep time ratio.

17. The wireless communications apparatus of claim 13, the memory retains further instructions related to monitoring one or more battery parameters and modifying the search pattern as a function of the monitored battery parameters.

18. The wireless communications apparatus of claim 17, the monitored battery parameters comprise an amount of power input by a battery charger, a level of power consumed during the service search, an acceptable battery charge rate, and a current battery power level.

19. The wireless communications apparatus of claim 17, wherein the monitoring determines the battery charging status changes between a being charged status and a not being charged status, and the modifying switches between an aggressive service search pattern corresponding to the being charged status and a non-aggressive service search pattern corresponding to the not being charged status.

20. The wireless communications apparatus of claim 13, wherein the memory retains further instructions related to:
    evaluating a rate of battery charging;
    determining a charging rate threshold as a function of a charge level present in the battery or independent of the charge level present in the battery;
    comparing the rate of battery charging to a rate threshold; and
    using a conservative search pattern if the rate is below the rate threshold or an aggressive search pattern if the rate is at or above the rate threshold.

21. A wireless communications apparatus that selects a service search pattern, comprising:
    means for employing a service search pattern based on a battery charging status, wherein the battery charging status is one of being charged and not being charged, the service search pattern is interrupted based on an external event, and the external event is a change from not being charged to being charged, a change from being charged to not being charged, or a user input;

means for monitoring status of a battery charge level and the battery charging status; and means for altering the service search pattern if the monitoring indicates a change to the battery charge level status or the battery charging status, wherein the service search is terminated when a service connection is established.

22. The wireless communications apparatus of claim 21, wherein the means for monitoring the status of the battery charge level and the battery charging status determines the battery charging status changes from being charged to not being charged and the means for altering the service search pattern switches from an aggressive service search pattern to a non-aggressive service search pattern.

23. The wireless communications apparatus of claim 21, wherein the means for monitoring the status of the battery charge level and the battery charging status determines the battery charging status changes from not being charged to being charged and the means for altering the service search pattern switches from a non-aggressive service search pattern to an aggressive service search pattern.

24. The wireless communications apparatus of claim 21, wherein the means for monitoring status of the battery charge level and the battery charging status observes at least one of an amount of power input by the battery charger, a level of power consumed during the service search, an acceptable battery charge rate, and a current battery power level.

25. The wireless communications apparatus of claim 21, further comprising:
means for evaluating a rate of battery charging;
means for determining a charging rate threshold as a function of a charge level present in the battery or independent of the charge level present in the battery;
means for comparing the rate of battery charging to a rate threshold; and
means for using a conservative search pattern if the rate is below the rate threshold or an aggressive search pattern if the rate is at or above the rate threshold.

26. A computer program product, comprising:
a computer-readable medium comprising:
a first set of codes for causing a computer to evaluate a battery charging status when a network connection is lost or sought;
a second set of codes for causing the computer to choose a network search pattern as a function of the battery charging status, wherein the network search pattern is interrupted based on an external event, and the external event is a change from not being charged to being charged, a change from being charged to not being charged, or a user input;
a third set of codes for causing the computer to search for service with the chosen network search pattern; and
a fourth set of codes for causing the computer to establish a connection with the network or a different network.

27. The computer program product of claim 26, the computer-readable medium further comprising:
a fifth set of codes for causing the computer to monitor the battery charging status while searching for service; and
a sixth set of codes for causing the computer to modify the selected network search pattern if there is a change to the battery charging status.

28. The computer program product of claim 27, wherein the monitoring observes at least one of an amount of power input by the battery charger, a level of power consumed during the service search, an acceptable battery charge rate, and a current battery power level.

29. The computer program product of claim 27, wherein the monitoring determines the battery charging status changes between a being charged status and a not being charged status, and the modifying switches between an aggressive service search pattern corresponding to the being charged status and a non-aggressive service search pattern corresponding to the not being charged status.

30. The computer program product of claim 26, wherein the computer-readable medium further comprises codes for:
evaluating a rate of battery charging;
determining a charging rate threshold as a function of a charge level present in the battery or independent of the charge level present in the battery;
comparing the rate of battery charging to a rate threshold; and
using a conservative search pattern if the rate is below the rate threshold or an aggressive search pattern if the rate is at or above the rate threshold.

31. At least one processor configured to search for a network as a function of a battery charging status, comprising:
a first module for evaluating a battery charging status when network access is lost or sought;
a second module for choosing a service search pattern as a function of the evaluation, wherein the service search pattern is interrupted based on an external event, and the external event is a change from not being charged to being charged, a change from being charged to not being charged, or a user input;
a third module for continuing to monitor the battery charging status;
a fourth module for modifying the search pattern if the battery charging status changes; and
a fifth module for discontinuing the search when network access is established.

32. The at least one processor of claim 31, wherein the service search pattern is aggressive if the battery charging status is being charged and the service search pattern is conservative if the battery charging status is not being charged.

33. The at least one processor of claim 31, further comprising modules for:
evaluating a rate of battery charging;
determining a charging rate threshold as a function of a charge level present in the battery or independent of the charge level present in the battery;
comparing the rate of battery charging to a rate threshold; and
using a conservative search pattern if the rate is below the rate threshold or an aggressive search pattern if the rate is at or above the rate threshold.

34. The at least one processor of claim 31, wherein the monitoring observes at least one of an amount of power input by the battery charger, a level of power consumed during the service search, an acceptable battery charge rate, and a current battery power level.

35. The at least one processor of claim 31, wherein the monitoring determines the battery charging status changes between a being charged status and a not being charged status, and the modifying switches between an aggressive service search pattern corresponding to the being charged status and a non-aggressive service search pattern corresponding to the not being charged status.

36. A method for wireless communications, comprising:
employing a processor to implement the following acts:
determining a battery charging status when a network connection is lost;
evaluating a rate of battery charging;

determining a charging rate threshold as a function of a charge level present in the battery or independent of the charge level present in the battery;
comparing the rate of battery charging to a rate threshold;
selecting a network search pattern as a function of the battery charging status;
searching for service with the selected network search pattern;
using a conservative search pattern if the rate is below the rate threshold or an aggressive search pattern if the rate is at or above the rate threshold; and
establishing a connection with the network or a different network.

37. A wireless communications apparatus, comprising:
a memory that retains instructions related to:
determining a battery charging status when a network connection is lost;
evaluating a rate of battery charging;
determining a charging rate threshold as a function of a charge level present in the battery or independent of the charge level present in the battery;
comparing the rate of battery charging to a rate threshold;
selecting a network search pattern as a function of the battery charging status;
searching for service with the selected network search pattern;
using a conservative search pattern if the rate is below the rate threshold or an aggressive search pattern if the rate is at or above the rate threshold; and
establishing a connection with the network or a different network; and
a processor, coupled to the memory, configured to execute the instructions retained in the memory.

38. A wireless communications apparatus, comprising:
means for determining a battery charging status when a network connection is lost;
means for evaluating a rate of battery charging;
means for determining a charging rate threshold as a function of a charge level present in the battery or independent of the charge level present in the battery;
means for comparing the rate of battery charging to a rate threshold;
means for selecting a network search pattern as a function of the battery charging status;
means for searching for service with the selected network search pattern;
means for using a conservative search pattern if the rate is below the rate threshold or an aggressive search pattern if the rate is at or above the rate threshold; and
means for establishing a connection with the network or a different network.

39. A computer program product, comprising:
a computer-readable medium comprising:
a first set of codes for causing a computer to determine a battery charging status when a network connection is lost;
a second set of codes for causing the computer to evaluate a rate of battery charging;
a third set of codes for causing the computer to determine a charging rate threshold as a function of a charge level present in the battery or independent of the charge level present in the battery;
a fourth set of codes for causing the computer to compare the rate of battery charging to a rate threshold;
a fifth set of codes for causing the computer to select a network search pattern as a function of the battery charging status;
a sixth set of codes for causing the computer to search for service with the selected network search pattern;
a seventh set of codes for causing the computer to use a conservative search pattern if the rate is below the rate threshold or an aggressive search pattern if the rate is at or above the rate threshold; and
an eighth set of codes for causing the computer to establish a connection with the network or a different network.

40. At least one processor configured to search for a network as a function of a battery charging status, comprising:
a first module for determining a battery charging status when a network connection is lost;
a second module for evaluating a rate of battery charging;
a third module for determining a charging rate threshold as a function of a charge level present in the battery or independent of the charge level present in the battery;
a fourth module for comparing the rate of battery charging to a rate threshold;
a fifth module for selecting a network search pattern as a function of the battery charging status;
a sixth module for searching for service with the selected network search pattern;
a seventh module for using a conservative search pattern if the rate is below the rate threshold or an aggressive search pattern if the rate is at or above the rate threshold; and
an eighth module for establishing a connection with the network or a different network.

41. A method for wireless communications, comprising:
employing a service search pattern based on a battery charging status, wherein the battery charging status is one of being charged and not being charged;
monitoring status of a battery charge level and the battery charging status, comprising observing at least one of an amount of power input by the battery charger, a level of power consumed during the service search, an acceptable battery charge rate, and a current battery power level; and
altering the service search pattern if the monitoring indicates a change to the battery charge level status or the battery charging status, wherein the service search is terminated when a service connection is established.

42. A wireless communications apparatus, comprising:
a memory that retains instructions related to:
employing a service search pattern based on a battery charging status, wherein the battery charging status is one of being charged and not being charged;
monitoring status of a battery charge level and the battery charging status, comprising observing at least one of an amount of power input by the battery charger, a level of power consumed during the service search, an acceptable battery charge rate, and a current battery power level; and
altering the service search pattern if the monitoring indicates a change to the battery charge level status or the battery charging status, wherein the service search is terminated when a service connection is established; and
a processor, coupled to the memory, configured to execute the instructions retained in the memory.

43. A wireless communications apparatus, comprising:
means for employing a service search pattern based on a battery charging status, wherein the battery charging status is one of being charged and not being charged;
means for monitoring status of a battery charge level and the battery charging status, comprising observing at least one of an amount of power input by the battery charger, a level of power consumed during the service search, an acceptable battery charge rate, and a current battery power level; and means for altering the service search pattern if the monitoring indicates a change to the battery charge level status or the battery charging status, wherein the service search is terminated when a service connection is established.

44. A computer program product, comprising:
a computer-readable medium comprising:
a first set of codes for causing a computer to employ a service search pattern based on a battery charging status, wherein the battery charging status is one of being charged and not being charged;
a second set of codes for causing the computer to monitor status of a battery charge level and the battery charging status, comprising observing at least one of an amount of power input by the battery charger, a level of power consumed during the service search, an acceptable battery charge rate, and a current battery power level; and
a third set of codes for causing the computer to alter the service search pattern if the monitoring indicates a change to the battery charge level status or the battery charging status, wherein the service search is terminated when a service connection is established.

45. At least one processor configured to search for a network as a function of a battery charging status, comprising:
a first module for employing a service search pattern based on a battery charging status, wherein the battery charging status is one of being charged and not being charged;
a second module for monitoring status of a battery charge level and the battery charging status, comprising observing at least one of an amount of power input by the battery charger, a level of power consumed during the service search, an acceptable battery charge rate, and a current battery power level; and
a third module for altering the service search pattern if the monitoring indicates a change to the battery charge level status or the battery charging status, wherein the service search is terminated when a service connection is established.

46. A method for wireless communications, comprising:
employing a service search pattern based on a battery charging status, wherein the battery charging status is one of being charged and not being charged;
monitoring status of a battery charge level and the battery charging status, comprising determining the battery charging status changes between a being charged status and a not being charged status; and
altering the service search pattern if the monitoring indicates a change to the battery charge level status or the battery charging status, the altering comprising switching between an aggressive service search pattern corresponding to the being charged status and a non-aggressive service search pattern corresponding to the not being charged status, wherein the service search is terminated when a service connection is established.

47. A wireless communications apparatus, comprising:
a memory that retains instructions related to:
employing a service search pattern based on a battery charging status, wherein the battery charging status is one of being charged and not being charged;
monitoring status of a battery charge level and the battery charging status, comprising determining the battery charging status changes between a being charged status and a not being charged status; and
altering the service search pattern if the monitoring indicates a change to the battery charge level status or the battery charging status, the altering comprising switching between an aggressive service search pattern corresponding to the being charged status and a non-aggressive service search pattern corresponding to the not being charged status, wherein the service search is terminated when a service connection is established; and
a processor, coupled to the memory, configured to execute the instructions retained in the memory.

48. A wireless communications apparatus, comprising:
means for employing a service search pattern based on a battery charging status, wherein the battery charging status is one of being charged and not being charged;
means for monitoring status of a battery charge level and the battery charging status, comprising means for determining the battery charging status changes between a being charged status and a not being charged status; and
means for altering the service search pattern if the monitoring indicates a change to the battery charge level status or the battery charging status, the means for altering comprising means for switching between an aggressive service search pattern corresponding to the being charged status and a non-aggressive service search pattern corresponding to the not being charged status, wherein the service search is terminated when a service connection is established.

49. A computer program product, comprising:
a computer-readable medium comprising:
a first set of codes for causing a computer to employ a service search pattern based on a battery charging status, wherein the battery charging status is one of being charged and not being charged;
a second set of codes for causing the computer to monitor status of a battery charge level and the battery charging status, comprising determining the battery charging status changes between a being charged status and a not being charged status; and
a third set of codes for causing the computer to alter the service search pattern if the monitoring indicates a change to the battery charge level status or the battery charging status, the altering comprising switching between an aggressive service search pattern corresponding to the being charged status and a non-aggressive service search pattern corresponding to the not being charged status, wherein the service search is terminated when a service connection is established.

50. At least one processor configured to search for a network as a function of a battery charging status, comprising:
a first module for employing a service search pattern based on a battery charging status, wherein the battery charging status is one of being charged and not being charged;
a second module for monitoring status of a battery charge level and the battery charging status, comprising determining the battery charging status changes between a being charged status and a not being charged status; and
a third module for altering the service search pattern if the monitoring indicates a change to the battery charge level status or the battery charging status, the altering comprising switching between an aggressive service search pattern corresponding to the being charged status and a non-aggressive service search pattern corresponding to the not being charged status, wherein the service search is terminated when a service connection is established.

* * * * *